April 9, 1957        A. FERRI        2,788,183
MULTI-SCOOP SUPERSONIC INLET
Filed Feb. 4, 1953        3 Sheets-Sheet 1
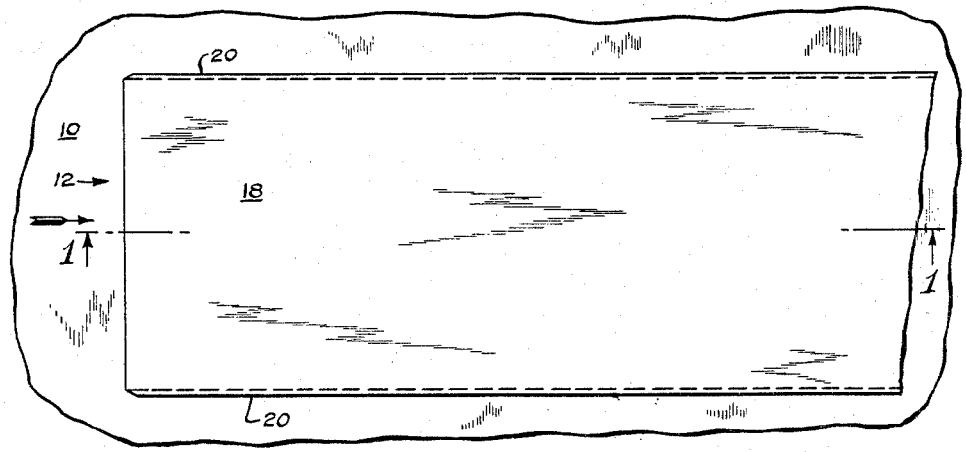
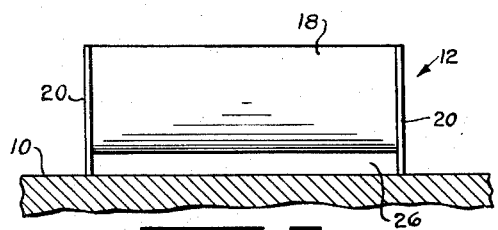
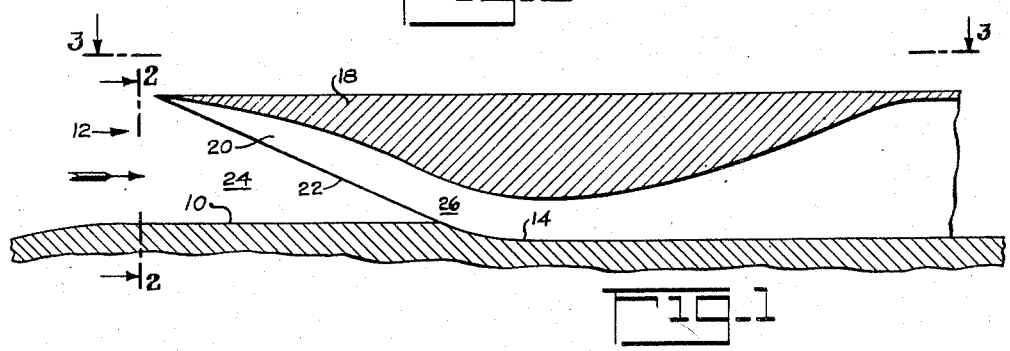
INVENTOR
ANTONIO FERRI
BY
ATTORNEY

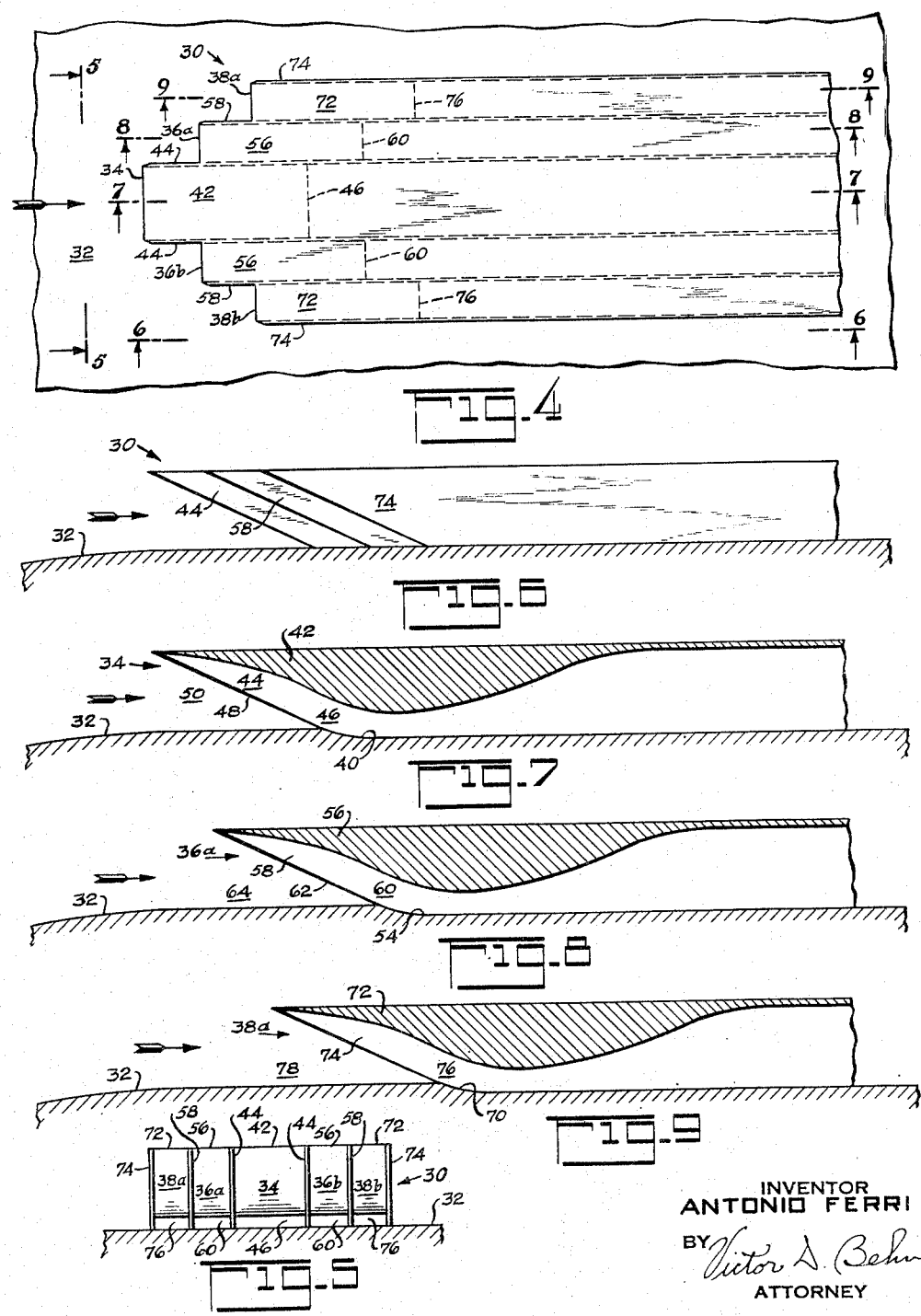

April 9, 1957 A. FERRI 2,788,183
MULTI-SCOOP SUPERSONIC INLET
Filed Feb. 4, 1953 3 Sheets-Sheet 3
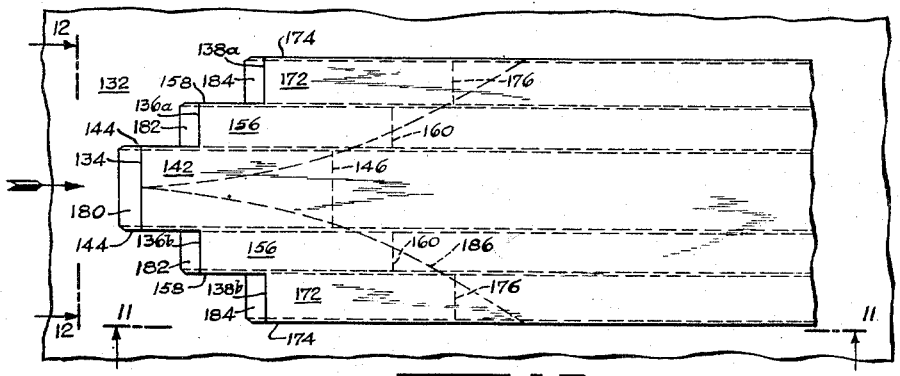
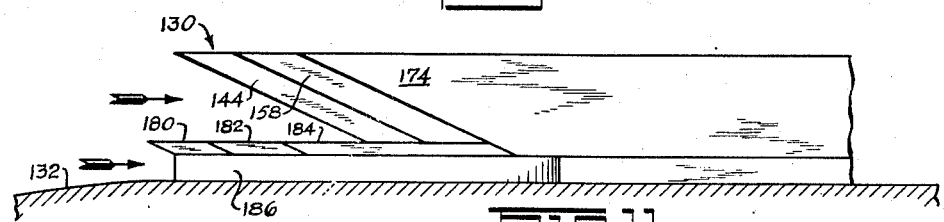
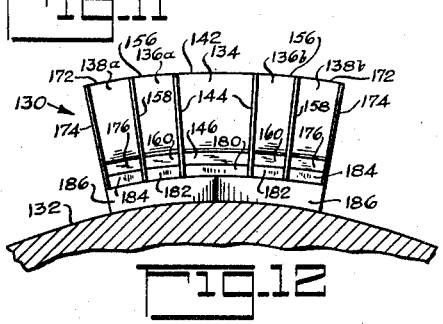
INVENTOR
ANTONIO FERRI
ATTORNEY

United States Patent Office 2,788,183
Patented Apr. 9, 1957

2,788,183

MULTI-SCOOP SUPERSONIC INLET

Antonio Ferri, Rockville Centre, N. Y., assignor to Curtiss-Wright Corporation, a corporation of Delaware Application February 4, 1953, Serial No. 335,016

10 Claims. (Cl. 244—53)

This invention relates to fluid inlets designed for supersonic entering flow and is particularly directed to scoop-type air inlets for aircraft designed for supersonic flight. By a "scoop-type" air inlet for an aircraft is meant an air inlet which projects laterally from an aircraft surface with the entrance opening of said inlet directed forwardly or upstream into the surrounding air flow.

Jet engines for aircraft (including missiles) designed for supersonic flight require air inlets operating at supersonic air velocities to supply the required mass flow of air to the engine combustion chamber. For maximum pressure recovery such an inlet is provided with a restricted or throat portion downstream of its leading edge and when functioning properly at supersonic flight speeds the inlet air flow velocity upstream of the inlet throat is supersonic while downstream of said inlet throat the air flow velocity is subsonic. When the supersonic inlet is so functioning it is said to have started. Initially the air flow velocity is subsonic throughout the inlet. For the inlet to start after sonic flight speed is exceeded a strong shock wave, which divides the supersonic flow from the subsonic flow must move from the inlet entrance down to the inlet throat whereby the transition from supersonic flow to subsonic flow moves from the inlet entrance down to the inlet throat. The mass flow of air that will pass through the inlet throat will be greater in the started condition so that during inlet starting part of the air downstream of said strong shock must spill outside the inlet.

Supersonic scoop-type inlets have been provided with swept-back side plates to permit spillage of air downstream of said strong shock wave during starting of the inlet. In such a scoop-type inlet the area available for spillage depends on the height $h$ of the inlet while for a given flight speed and inlet throat contraction the amount of air which must be spilled in order to insure inlet starting depends on the frontal area of the inlet. It is evident therefore that, other factors being the same, a high narrow inlet will start easier than a low wide inlet of the same frontal area and that unless the ratio $h/d$ (where $d$ is the inlet width) is sufficiently large the inlet may not start. However a high narrow inlet, that is one in which the ratio $h/d$ is large, is objectionable because such an inlet is difficult to install without excessive aerodynamic drag as compared to an inlet of the same frontal area but in which the ratio $h/d$ is relatively small. The ratio $h/d$ is termed the inlet "aspect" ratio.

An object of the present invention comprises the provision of a supersonic scoop-type inlet in which said aspect ratio of the entire frontal area of the inlet is relatively low and yet the inlet has sufficient spillage area for starting. A further object of the present invention comprises the provision of a composite scoop-type inlet in which the inlet is divided into a plurality of independent supersonic inlets, each said independent inlet having a relatively high aspect ratio and having its own spillage area so as to be capable of starting independently of the other small inlets.

Other objects of the invention will become apparent upon reading the annexed detailed description in connection with the drawing in which:

Fig. 1 is a sectional view through a conventional scoop-type inlet having swept-back side plates, said view being taken along line 1—1 of Fig. 3;

Fig. 2 is a front end view of the inlet of Fig. 1 and taken along line 2—2 of Fig. 1;

Fig. 3 is a plan view taken along line 3—3 of Fig. 1;

Fig. 4 is a plan view similar to Fig. 3 but of an inlet embodying the invention;

Figs. 5, 6, 7, 8 and 9 are views taken along lines 5—5, 6—6, 7—7, 8—8 and 9—9 respectively, of Fig. 4;

Fig. 10 is a view similar to Fig. 4 but of a modified construction; and

Figs. 11 and 12 are views taken along lines 11—11 and 12—12, respectively of Fig. 10.

Referring first to Figs. 1–3 of the drawing, reference numeral 10 designates the surface of an aircraft fuselage, wing or other body member of an aircraft designed for supersonic flight and powered by a jet engine requiring air for combustion. Combustion air for the jet engine is taken in through a scoop-type inlet 12 projecting from the surface 10. Except for its air inlet 12, the jet engine is not shown in the drawing since other details of the jet engine form no part of the present invention. Thus said engine may comprise a conventional ram jet engine.

The air inlet 12 is rectangular in cross-section and is bounded by the surface 10, the continuation 14 of said surface, the facing surface of an outer plate 18 and by two side plates 20. The side plates 20 are cut or swept back from the leading edge of the outer plate 18 along a line 22. At the designed flight speed of the aircraft the line 22 coincides with the oblique shock wave within the inlet and extending from said leading edge of the outer plate 18. This swept-back construction of the side plates 20 provides triangular openings 24 in each side plate tapering downstream toward and terminating at the inlet throat 26. The inner surface of the plate 18 is profiled to form said inlet throat 26 at the point the line 22 strikes the surface 10. The surface 14 begins at said throat and preferably is contoured similar to the inner surface of the cowl in a conventional supersonic nose-type inlet comprising an annular cowl surrounding a forwardly projecting center body or nose portion. During starting of the inlet 12, a portion of the air downstream of the strong shock wave entering the inlet spills out laterally through the side plate openings 24 to permit said strong shock wave to move down to the inlet throat 26.

With a scoop-type inlet 12 having swept back side plates such as the inlet 12, the magnitude of the spillage areas 24 can be increased without changing the frontal area by increasing the height $h$ of the inlet and decreasing its width $d$, thereby facilitating starting of the inlet. Thus for an inlet requiring a given frontal or entrance area, the inlet will start more readily if the aspect ratio ($h/d$) of the inlet is large. That is, other conditions being the same, such as scoop-type inlet of high aspect ratio will start easier than one of low aspect ratio. On the other hand a scoop-type inlet having a high aspect ratio is difficult to install without excessive aerodynamic drag as compared to an inlet of the same frontal area but having a low aspect ratio.

Referring now to Figs. 4–9, there is illustrated a composite scoop-type inlet 30 embodying the invention. The inlet 30 projects from an aircraft surface 32 and is divided into a plurality of small side-by-side scoop-type inlets 34, 36a, 36b, 38a and 38b. The inlet 34 is disposed between the inlets 36a and 36b and the inlets 38a and 38b are disposed adjacent to the remote sides of the inlets 36a and 36b respectively. The inlet 34 is bounded by the surface 32 and its continuation 40, by an outer plate 42 and by two side plates 44. The surfaces 32 and 40 and the facing surface of the outer plate 42 are contoured like the corresponding surfaces of the inlet 12 thereby forming the inlet throat 46 at the junction of the surfaces 32 and 40. The side plates 44 are cut or swept back from the leading edge of the outer plate 42 along a line 48. As in the case of the inlet 12, at the designed flight speed of the aircraft the line 48 preferably coincides with the oblique shock wave disposed within the inlet and extending from the leading edge of said plate 42. This cut or swept construction of the side plates 44 provides triangular air spillage areas 50 tapering downstream toward and terminating at the inlet throat 46 and through which air can spill during starting of the inlet. During starting of the inlet 34 some of the air, downstream of the strong shock wave entering the inlet, spills out laterally through the spillage areas 50 to permit said shock wave to move down to the inlet throat 46. The scoop-type inlet 34 obviously is similar to the previously described inlet 12 except, as illustrated, the inlet 34 has a higher aspect ratio.

The leading edge of the inlet 36a is set back or downstream of the inlet 34. The magnitude of this set back is hereinafter discussed. The inlet 36a is bounded by the surface 32 and its continuation 54 downstream of the inlet throat, by an outer plate 56, by the side plate 44 and by a side plate 58. The surfaces 32 and 54 within the inlet and the facing surface of the outer plate 56 are contoured like the corresponding inner and outer wall surfaces of the inlets 12 and 34 thereby forming the inlet throat 60 at the junction of the surfaces 32 and 54. The side plate 58 is cut or swept back from the leading edge of the outer plate 56 along a line 62 which, at the designed aircraft flight speed, coincides with the oblique shock wave disposed within the inlet 36a and extending from said leading edge of the outer plate 56. This swept-back construction of the side plate 58 provides a triangular air spillage area 64 tapering downstream toward and terminating at the inlet throat 60 and through which some air spills during starting of the inlet 36a to permit the strong shock wave (marking the transition between supersonic and subsonic flow) to move down to the inlet throat 60. Thus the inlet 36a starts in a manner similar to the inlet 34 except the inlet 36a has only one swept-back side plate 58 forming a spillage area for its air during starting. No air spillage takes place from the inlet 36a to the inlet 34 through the spillage area 46 formed by the adjacent swept-back side plate 44. This is so because since the inlet 34 starts before the inlet 36a the pressure during inlet starting will be higher in the inlet 34.

The inlet 38a is set back or disposed downstream farther than the inlet 36a to an extent hereinafter described. The inlet 38a is bounded by the surface 32 and its continuation 70, by an outer plate 72, by the side plate 58 of the inlet 36a and by a side plate 74. The surfaces 32 and 70 within the inlet and the facing surface of the outer plate 72 are contoured like the corresponding inner and outer wall surfaces of the inlets 12, 34 and 36a thereby forming the inlet throat 76 at the junction of the surfaces 32 and 70. The side plate 74 is cut or swept back from the leading edge of the outer plate 72 along a line 76 which, at the designed flight speed of the aircraft, preferably coincides with the oblique shock wave disposed within the inlet 36a and extending from said leading edge of the outer plate 72. This swept-back construction of the side plate 74 provides a triangular air spillage area 78 tapering downstream toward the inlet throat and through which some air spills during starting of the inlet 38a to permit the strong shock wave (marking the transition between supersonic flow and subsonic flow) to move down to the inlet throat. Thus the inlet 38a starts in a manner to the inlet 36a and, like the inlet 36a, during starting of the inlet 38a air spills out from only one side of the inlet through the area 78, spillage out from the other side of the inlet through the area 64 being prevented by the higher pressure in the inlet 36a.

The inlets 36b and 38b are identical to the inlets 36a and 38a, respectively, except they are disposed on the opposite side of the central inlet 34 and hence like parts have been indicated by like reference numerals.

The inlets 34, 36a, 36b, 38a and 38b, making up the composite inlet 30, start independently of each other with the central inlet 34 starting first followed in succession by the inlets 36a and 36b and then by the inlets 38a and 38b. Furthermore although the aspect ratio of the composite inlet 30 is low, the aspect ratio of each individual inlet is relatively high. Therefore each individual inlet making up the composite inlet 30 will start relatively easy compared to a single inlet having the overall frontal area and aspect ratio of the composite inlet 30 and at the same time the overall low aspect ratio of the composite inlet facilitates its installation without excessive aerodynamic drag. Obviously the composite inlet 30 may be divided into any number of independent inlets so that the aspect ratio of each independent inlet may be made as high as desired.

Some of the air which spills from the inlet 34 through the spillage opening 50 adjacent to the inlet 36a enters this latter inlet thereby increasing the amount of air which must be spilled from the inlet 36a in order to start said inlet. The magnitude of this increase in the air which must be spilled from the inlet 36a depends on how far the inlet 36a is set back. If the inlet 36a is only slightly set back then substantially all the air spilling from the inlet 34 through the spillage opening 50 adjacent to the inlet 36a enters said inlet 36a thereby making it difficult to start the inlet 36a. On the other hand, if the inlet 36a is set back to such an extent that the leading edge of its outer plate 56 is downstream of or only extends slightly forward of the throat 46 of inlet 34 then substantially all the air spilling from the inlet 34 through said spillage opening 50 spills into the airstream ahead of the inlet 36a and therefore does not add to the air which must be spilled from the inlet 36a in starting said inlet 36a. In order that the composite inlet 30 be as short as possible, the inlet 36a should only be set back far enough to insure starting of said inlet and therefore the magnitude of said set back will vary with each installation. For reasons of symmetry the inlet 36b preferably is set back from the inlet 34 to the same extent as the inlet 36a. Obviously, the same factors which determine the amount the inlets 36a and 36b are set back from the inlet 34 determine the amount the inlets 38a and 38b are set back from their adjacent inlets 36a and 36b respectively.

The inlets 34, 36a, 36b, 38a and 38b may all be connected together downstream of their respective throats to a common passage, for example if said inlets are all to supply air to a single combustion chamber. Alternatively, only certain inlets may be connected together or each inlet may supply air to its own combustion chamber. For example in the case of a supersonic aircraft powered by a plurality of jet engines each of said inlets may supply air for combustion to its own jet engine.

In the composite scoop-type inlet 30, no attempt has been made to remove the boundary layer of relatively slow moving air adjacent to the aircraft surface 32. Removal of this boundary layer results in the air having a substantially uniform velocity across the inlet entrance thereby improving the performance of the inlet. Figs. 10–12 illustrate a modification of Figs. 4–9 in which a scoop for removal of said boundary layer has been added.

In Figs. 4–9, the aircraft surface 32 from which the scoop inlet 30 projects is flat. Obviously, however, said surface may be arcuate. This feature is also illustrated in Figs. 10–12. Except for the differences already noted the structure of Figs. 10–12 is like that of Figs. 4–9 and the parts of Figs. 10–12 corresponding to parts of Figs. 4–9 have been indicated by the same reference numerals as the corresponding part of Figs. 4–9 but with one hundred added thereto.

In Figs. 10–12 the one boundary of each inlet instead of being formed by the aircraft surface 132 is formed by a floor or platform spaced from said surface. Thus, as illustrated, floors 180, 182 and 184, instead of the surface 132, form the inner boundaries of the inlets 134, 134a, 136b, 138a, and 138b. Between said inlet floors and the aircraft surface 132 there is provided a spike-type scoop 186 for taking the boundary layer of air flowing over the aircraft surface 132 and deflecting said air laterally from the composite scoop 130. The aircraft surface 132, although illustrated as being arcuate, could be flat like the surface 32 of Figs. 4–9.

Except for the improved performance resulting from removal of the boundary layer adjacent to the aircraft surface from which the scoop inlet projects, the starting characteristics of the composite inlet 130 of Figs. 10–12 are essentially the same as those of the composite inlet 30 of Figs. 4–9. Hence no further description of Figs. 10–12 is deemed necessary.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with a body member of an aircraft designed for supersonic flight; a composite scoop-type inlet projecting laterally from said body member; said composite inlet comprising a central scoop-type inlet and a pair of scoop-type inlets disposed on opposite sides of said central inlet and displaced downstream relative to said central inlet with each inlet having a throat portion downstream of its leading edge; said central inlet having a pair of side walls with each of said side walls having a portion thereof spaced from said body member to form an opening upstream of the throat of said central inlet and each of said side walls also acting as a side wall of the adjacent side inlet thereby forming a common side wall between said central inlet and the adjacent side inlet; said side inlets each having another side wall facing its common side wall, said other side wall having a portion thereof spaced from said body member to form an opening upstream of the throat of its side inlet.

2. In combination with a body member of an aircraft designed for supersonic flight; a composite scoop-type inlet projecting laterally from said body member; said composite inlet comprising a central scoop-type inlet and a pair of scoop-type inlets disposed on opposite sides of and displaced downstream relative to said central inlet with each inlet having a throat portion downstream of its leading edge; said central inlet having a pair of side walls with each of said side walls having a portion thereof spaced from said body member to form an opening of maximum width adjacent to the upstream end of said central inlet, the opening tapering in a downstream direction toward the throat of said central inlet and each of said side walls also acting as a side wall of the adjacent side inlets thereby forming a common side wall between said central inlet and the adjacent side inlet; said side inlets each having another side wall facing its common side wall, said other wall having a portion thereof spaced from said body member to form an opening of maximum width adjacent to the upstream end of said side inlet, the opening tapering in a downstream direction toward the throat of said side inlet.

3. In combination with a body member of an aircraft designed for supersonic flight; a composite scoop-type inlet projecting laterally from said body member; said composite inlet comprising a central scoop-type inlet and a pair of scoop-type inlets disposed on opposite sides of said central inlet and displaced downstream relative to said central inlet with each inlet having a throat portion downstream of its leading edge; said central inlet having a pair of side walls, and an outer wall; each of said side walls being cut back from the leading edge of the outer wall to provide a triangular opening in said side wall, the opening tapering toward the throat of said central inlet and each of said side walls also acting as a side wall of the adjacent side inlet thereby forming a common side wall between said central inlet and the adjacent side inlet; said side inlets each having another side wall facing its common side wall and also each having an outer wall, the other side wall of each side inlet being cut back from the leading edge of the outer wall of said side inlet to provide in said other side wall a triangular opening tapering toward the throat of its side inlet.

4. In combination with a body member of an aircraft designed for supersonic flight; a composite scoop-type air inlet projecting laterally from said body member; said composite inlet comprising first and second side-by-side scoop-type inlets having a common side wall with the leading edge of said second inlet being disposed downstream of the leading edge of said first inlet; said first inlet also having inner and outer walls and a side wall opposite to said common side wall with said inner and outer walls being contoured to provide an inlet throat downstream of the leading edge of said outer wall and with each said side wall being cut back from the leading edge of said outer wall to provide a triangular opening in said side wall tapering toward the inlet throat; said second inlet also having inner and outer walls and a side wall opposite to said common side wall with said inner and outer walls being contoured to provide an inlet throat downstream of the leading edge of said second inlet outer wall, said opposite side wall of said second inlet being cut back from the outer wall of said second inlet to provide a triangular opening in said opposite side wall tapering toward the throat of said second inlet.

5. In combination with a body member of an aircraft designed for supersonic flight; a composite scoop-type inlet projecting laterally from said body member; said composite inlet comprising a group of side-by-side inlets including a central inlet and a plurality of side inlets with the leading edge of the central inlet being disposed upstream of the leading edges of the side inlets and with the leading edge of each side inlet being disposed upstream of any adjacent side inlet more removed from the center of the group, each pair of adjacent inlets of said group being separated by a common side wall and each inlet of said group having a throat portion disposed downstream of its leading edge, each side wall of said central inlet being cut back from the leading edge of the outer wall of said central inlet to provide a triangular opening in said side wall tapering toward the throat of said central inlet and each side inlet side wall farthest removed from the central inlet being cut back from the leading edge of the outer wall of said side inlet to provide a triangular opening in said side wall tapering toward the throat of its side inlet.

6. In combination with the body member of an aircraft designed for supersonic flight; a composite scoop-type inlet projecting laterally from said body member; said composite inlet comprising a group of side-by-side inlets including a central inlet and a plurality of inlets disposed on each side of said central inlet with the leading edge of the central inlet being disposed upstream of the leading edges of the side inlets and with the leading edge of each side inlet being disposed upstream of any adjacent side inlet more removed from the central inlet, each pair of adjacent inlets of said group being separated by a common side wall and each inlet of said group having a throat portion disposed downstream of its leading edge, each side wall of said central inlet being cut back from the leading edge of the outer wall of said central inlet to provide a triangular opening in said side wall tapering toward and terminating at the throat of said central inlet and each side inlet side wall farthest removed from the central inlet being cut back from the leading edge of the outer wall of said side inlet to provide a triangular opening in said side wall tapering toward and terminating at the throat of its side inlet.

7. In combination with a body member of an aircraft designed for supersonic flight; a composite scoop-type inlet projecting laterally from said body member; said composite inlet comprising a central scoop-type inlet and a pair of scoop-type inlets disposed on opposite sides of said central inlet and displaced downstream relative to said central inlet with each said inlet having a throat portion disposed downstream of its leading edge; said central inlet having a pair of side walls, an outer wall and a floor member, each side wall of said central inlet being cutback from the leading edge of the outer wall of said central inlet along a line which, at the designed aircraft flight speed, substantially coincides with the oblique shock wave extending from said leading edge into said inlet so as to provide a triangular opening in said side wall tapering toward the throat of said central inlet and said side wall of said central inlet also forming a side wall of the adjacent side inlet, thereby acting as a common side wall between said central inlet and the adjacent side inlet, said side inlets each having another side wall facing its common side wall, and having an outer wall and floor member, the other side wall of each side inlet being cut back from the leading edge of the outer wall of said side inlet along a line which, at the designed aircraft flight speed, substantially coincides with the oblique shock wave extending from said side inlet leading edge into said side inlet so as to provide a triangular opening in said other side wall tapering toward said side inlet throat.

8. The combination recited in claim 3 in which each inlet includes a floor member forming the wall of said inlet adjacent to said body member and the leading edge portion of each said floor member is spaced from the adjacent surface of the aircraft body member from which the composite inlet projects, and an air deflection scoop disposed between said floor member leading edge portions and said aircraft body member for removing the boundary layer of air flowing over said aircraft body member surface.

9. The combination recited in claim 3 in which each central inlet side wall trangular opening terminates substantially at the throat of said central inlet and in which each side inlet side wall trangular opening terminates substantially at the throat of its side inlet.

10. The combination recited in claim 7 in which each central inlet side wall triangular opening terminates substantially at the throat of said central inlet and in which each adjacent side inlet side wall triangular opening terminates substantially at the throat of its side inlet.

References Cited in the file of this patent

UNITED STATES PATENTS

| | | |
|---|---|---|
| 1,983,405 | Schmidt | Dec. 4, 1934 |
| 2,589,945 | Leduc | Mar. 18, 1952 |
| 2,631,425 | Nordfors | Mar. 17, 1953 |
| 2,633,699 | Goddard | Apr. 7, 1953 |
| 2,638,738 | Salter | May 19, 1953 |

FOREIGN PATENTS

| | | |
|---|---|---|
| 597,915 | Great Britain | Feb. 5, 1948 |
| 614,548 | Great Britain | Dec. 17, 1948 |
| 997,685 | France | Sept. 12, 1951 |